(12) United States Patent
Roos et al.

(10) Patent No.: US 8,627,654 B2
(45) Date of Patent: Jan. 14, 2014

(54) METHOD OF TREATING EMISSIONS OF A HYBRID VEHICLE WITH A HYDROCARBON ABSORBER AND A CATALYST BYPASS SYSTEM

(75) Inventors: Bryan Nathaniel Roos, West Bloomfield, MI (US); Eugene V. Gonze, Pinckney, MI (US); Halim G. Santoso, Novi, MI (US); Brian L. Spohn, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 13/196,263

(22) Filed: Aug. 2, 2011

(65) Prior Publication Data

US 2013/0031889 A1 Feb. 7, 2013

(51) Int. Cl.
*F01N 3/10* (2006.01)
(52) U.S. Cl.
USPC .......................................................... 60/300
(58) Field of Classification Search
USPC ................... 60/274, 285, 286, 297, 300, 303; 180/65.1, 65.21
See application file for complete search history.

(56) References Cited

U.S. PATENT DOCUMENTS

| | | | | |
|---|---|---|---|---|
| 5,467,594 A * | 11/1995 | Aoki et al. | ...................... | 60/276 |
| 5,761,902 A * | 6/1998 | Usami et al. | .................... | 60/288 |
| 6,059,057 A * | 5/2000 | Yamazaki et al. | ....... | 180/65.235 |
| 6,327,852 B1 * | 12/2001 | Hirose | .............................. | 60/297 |
| 6,856,034 B2 * | 2/2005 | Peters et al. | ................. | 290/40 C |
| 7,792,627 B1 * | 9/2010 | Santoso et al. | ................ | 701/102 |
| 2004/0083716 A1 * | 5/2004 | Twigg | .............................. | 60/284 |
| 2007/0204601 A1 * | 9/2007 | Ishii et al. | ....................... | 60/295 |
| 2007/0283684 A1 * | 12/2007 | Matsubara | ...................... | 60/285 |
| 2008/0028746 A1 * | 2/2008 | Matsubara et al. | ............. | 60/279 |
| 2008/0236148 A1 * | 10/2008 | Ichimoto | ......................... | 60/297 |
| 2008/0282686 A1 * | 11/2008 | Gonze et al. | .................... | 60/300 |
| 2009/0025371 A1 * | 1/2009 | Hermansson et al. | .......... | 60/286 |
| 2009/0133388 A1 * | 5/2009 | Watanabe et al. | ............... | 60/286 |
| 2010/0115927 A1 * | 5/2010 | Sano et al. | ...................... | 60/287 |
| 2010/0205939 A1 * | 8/2010 | Sano et al. | ...................... | 60/276 |
| 2010/0256849 A1 * | 10/2010 | Akimoto | ......................... | 701/22 |
| 2010/0319327 A1 * | 12/2010 | Sano et al. | ...................... | 60/286 |
| 2011/0072802 A1 * | 3/2011 | Bidner et al. | ................... | 60/287 |

* cited by examiner

*Primary Examiner* — Thomas Denion
*Assistant Examiner* — Mickey France
(74) *Attorney, Agent, or Firm* — Quinn Law Group, PLLC

(57) ABSTRACT

A method of treating emissions from an internal combustion engine of a hybrid vehicle includes directing a flow of air created by the internal combustion engine when the internal combustion engine is spinning but not being fueled through a hydrocarbon absorber to collect hydrocarbons within the flow of air. When the hydrocarbon absorber is full and unable to collect additional hydrocarbons, the flow of air is directed through an electrically heated catalyst to treat the flow of air and remove the hydrocarbons. When the hydrocarbon absorber is not full and able to collect additional hydrocarbons, the flow of air is directed through a bypass path that bypasses the electrically heated catalyst to conserve the thermal energy stored within the electrically heated catalyst.

15 Claims, 2 Drawing Sheets

METHOD OF TREATING EMISSIONS OF A HYBRID VEHICLE WITH A HYDROCARBON ABSORBER AND A CATALYST BYPASS SYSTEM

RELATED GOVERNMENT CONTRACTS

This invention was made with United States Government support under Agreement No. DE-FC26-08NT04386, A000 awarded by the Department of Energy, Project No: vss018. The U.S. Government may have certain rights in this invention.

TECHNICAL FIELD

The invention generally relates to a method of controlling a hybrid vehicle, and more specifically to a method of treating a flow of air created from an internal combustion engine of a hybrid vehicle when the internal combustion engine is spinning but not being fueled.

BACKGROUND

Hybrid vehicles with an Internal Combustion Engine (ICE) include an exhaust gas treatment system for reducing the toxicity of the exhaust gas from the engine. The treatment system typically includes a catalytic converter unit, which includes a catalyst that reduces nitrogen oxides in the exhaust gas to nitrogen and carbon dioxide or water, as well as oxidizes carbon monoxide (CO) and unburnt hydrocarbons (HCs) to carbon dioxide and water. The catalyst may include, but is not limited to, Platinum Group Metals (PGM). The catalyst must be heated to a light-off temperature of the catalyst before the catalyst becomes operational. Accordingly, the exhaust gas must heat the catalyst to the light-off temperature before the reaction between the catalyst and the exhaust gas begins.

The hybrid vehicle may further include an electric motor. The internal combustion engine and the electric motor may each be selectively engaged to power the vehicle, i.e., the internal combustion engine and the electric motor may each be selectively engaged to generate a drive torque for a transmission. When the electric motor is being engaged to provide the drive torque to the transmission, the internal combustion engine is typically not being fueled and is not running. However, because both the electric motor and the internal combustion engine are coupled to the transmission to provide the drive torque to the transmission, the electric motor may cause the internal combustion engine to spin when the electric motor is engaged to provide the drive torque. Alternatively, the internal combustion engine may have to be spun in an un-fueled condition to provide additional drive torque if the driver requests it to allow more torque from the electric motor to go to the wheels. When the internal combustion engine is being spun while the electric motor is providing the drive torque, the internal combustion engine produces a flow of air which is directed through the exhaust gas treatment system. This flow of air collects hydrocarbons from the engine and conveys the hydrocarbons through the exhaust treatment system. Furthermore, this flow of air is not heated, and cools the components of the exhaust gas treatment system, including the catalyst. If the catalyst is cooled to a temperature below the light-off temperature, then the flow of air containing the hydrocarbons suspended therein may not be properly treated. Additionally, if the catalyst is cooled to a temperature below the light-off temperature then exhaust gas from the internal combustion engine, once fueled and running, may also not be properly treated.

SUMMARY

A method of operating a hybrid vehicle is provided. The method includes determining if an internal combustion engine is spinning or is not spinning, and determining if the internal combustion engine is being fueled to generate a drive torque when the internal combustion engine is spinning, or if the internal combustion engine is not being fueled when the internal combustion engine is spinning. A flow of air created by the internal combustion engine when the internal combustion engine is spinning and is not being fueled is directed through a hydrocarbon absorber to collect hydrocarbons disposed in the flow of air.

A method of treating a flow of air from an internal combustion engine of a hybrid vehicle is also provided. The method includes determining if the internal combustion engine is spinning or is not spinning, and determining if the internal combustion engine is being fueled to generate a drive torque when the internal combustion engine is spinning, or if the internal combustion engine is not being fueled when the internal combustion engine is spinning. A flow of air created by the internal combustion engine when the internal combustion engine is spinning and is not being fueled is directed through a hydrocarbon absorber to collect hydrocarbons disposed in the flow of air. An electrically heated catalyst is heated to a light-off temperature. The electrically heated catalyst is disposed downstream of the hydrocarbon absorber. The method further includes determining if the hydrocarbon absorber is disposed at a full capacity and unable to absorb additional hydrocarbons, or if the hydrocarbon absorber is disposed at a not full capacity and is able to absorb additional hydrocarbons. The flow of air is directed across the electrically heated catalyst at the light-off temperature to oxidize the hydrocarbons disposed in the flow of air when the internal combustion engine is spinning, the internal combustion engine is not being fueled and the hydrocarbon absorber is disposed at the full capacity. The flow of air is directed through a bypass path to a primary catalyst disposed downstream of the hydrocarbon absorber when the internal combustion engine is spinning, the internal combustion engine is not being fueled and the hydrocarbon absorber is disposed at the not full capacity. The flow of air is directed through the bypass path to bypass the electrically heated catalyst and conserve thermal energy within the electrically heated catalyst.

A vehicle is also provided. The vehicle includes a transmission that is configured for receiving a drive torque and transmitting the drive torque to a drive wheel. An internal combustion engine is coupled to the transmission and is configured for selectively supplying the drive torque to the transmission. An exhaust gas treatment system is coupled to the internal combustion engine. The exhaust gas treatment system treats a flow of exhaust gas created by the internal combustion engine when the internal combustion engine is being fueled. An electric motor is coupled to the transmission and is configured for selectively supplying the drive torque to the transmission. The electric motor spins the internal combustion engine in an un-fueled state thereby creating a flow of unheated air through the exhaust gas treatment system when the electric motor is supplying the drive torque to the transmission. The exhaust gas treatment system includes a hydrocarbon absorber. An electrically heated catalyst is disposed downstream from the hydrocarbon absorber. A primary catalyst is disposed downstream from the hydrocarbon absorber. A bypass path is disposed in fluid communication with the primary catalyst. The bypass path defines a fluid flow path that bypasses the electrically heated catalyst. A bypass valve controls fluid flow through the bypass path. The bypass valve is disposed in a closed position to direct the flow of air across the electrically heated catalyst when the electric motor is supplying the drive torque to the transmission and spinning the internal combustion engine, while the internal combustion engine is not being fueled and the hydrocarbon absorber is at a full capacity and unable to absorb additional hydrocarbons. The bypass valve is disposed in an open position to allow fluid flow through the bypass path and direct the flow of air from the internal combustion engine through the primary catalyst when the electric motor is supplying the drive torque to the transmission and spinning the internal combustion engine, while the internal combustion engine is not being fueled and the hydrocarbon absorber is at a not full capacity and is able to absorb additional hydrocarbons.

Accordingly, when the electric motor is spinning the internal combustion engine while the internal combustion engine is not being fueled, thereby creating a flow of air from the engine through the exhaust gas treatment system, the flow of air is directed through the hydrocarbon absorber to collect any hydrocarbons in the flow of air. If the hydrocarbon absorber is not at the full capacity and able to absorb additional hydrocarbons, the flow of air is directed around, i.e., bypasses, the electrically heated catalyst to maintain thermal energy within the electrically heated catalyst. In the event the internal combustion engine is fueled and thereafter generates a flow of exhaust gas, the flow of exhaust gas may initially be directed through the pre-heated electrically heated catalyst until the primary catalyst is heated by the exhaust gas. If the hydrocarbon absorber is at full capacity and is not able to absorb additional hydrocarbons, the flow of air is directed through the electrically heated catalyst so that the electrically heated catalyst may treat the flow of air to remove the hydrocarbons therefrom. When the internal combustion engine is eventually fueled to generate the drive torque, thereby generating a flow of heated exhaust gases, the heated exhaust gases heat the hydrocarbon absorber to burn off the hydrocarbons collected therein.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
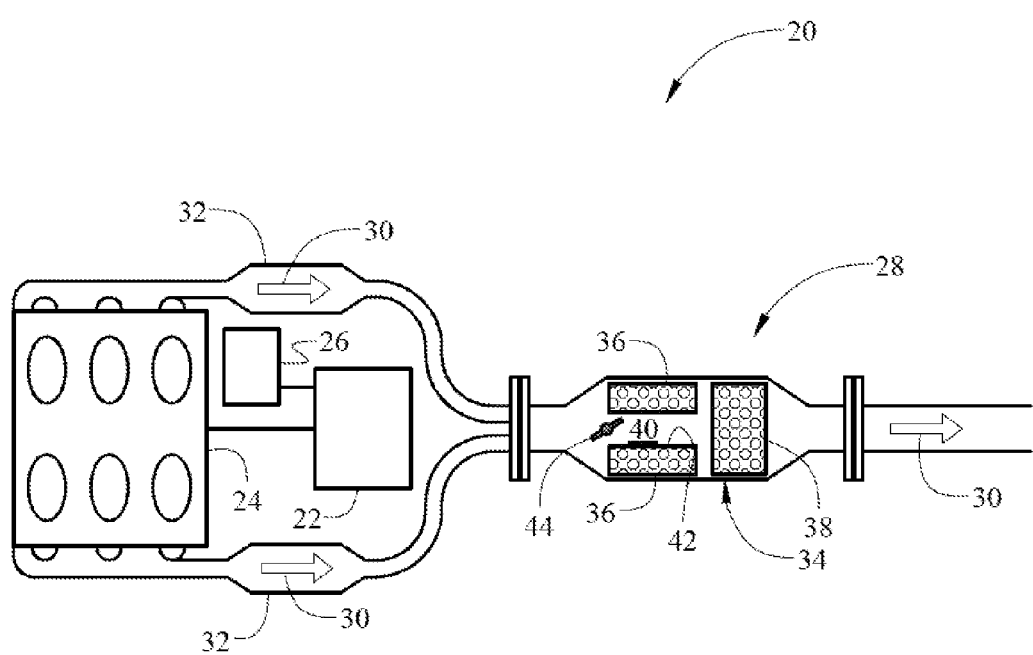
FIG. 1 is a schematic diagram of a hybrid vehicle showing an exhaust gas treatment system for an internal combustion engine

Referring to the Figures, wherein like numerals indicate like parts throughout the several views, a hybrid vehicle is shown generally at 20 in FIG. 1. Referring to FIG. 1, the hybrid vehicle 20 includes a transmission 22. The transmission 22 is configured for receiving a drive torque and transmitting the drive torque to a drive wheel (not shown). The transmission 22 may include but is not limited to an automatic transmission 22. The transmission 22 receives the drive torque from an internal combustion engine 24 and/or an electric motor 26. Both the internal combustion engine 24 and the electric motor 26 are coupled to the transmission 22 and configured for selectively supplying the drive torque to the transmission 22. The internal combustion engine 24 may include but is not limited to a gasoline engine or a diesel engine, and may include any suitable size and/or configuration suitable to satisfy output and performance requirements of the hybrid vehicle 20. The electric motor 26 may include any suitable size, style and/or configuration of electric motor 26 suitable to satisfy the output and performance requirements of the hybrid vehicle 20.

The hybrid vehicle 20 may engage either the internal combustion engine 24 or the electric motor 26 to generate the drive torque. The electric motor 26 supplies all of the drive torque when engaged. When the electric motor 26 is engaged to exclusively supply the drive torque to the transmission 22, the electric motor 26 may also spin the internal combustion engine 24. However, because the internal combustion engine 24 is not being engaged to supply the drive torque, the internal combustion engine 24 is not fueled. Accordingly, when the electric motor 26 is engaged to supply the drive torque, the electric motor 26 may spin the internal combustion engine 24 in an un-fueled state. When the internal combustion engine 24 spins in the un-fueled state, the internal combustion engine 24 creates a flow of unheated air, which flows through an exhaust gas treatment system 28. Hydrocarbons from the internal combustion engine 24 may be collected and/or suspended in the flow of air.

The exhaust gas treatment system 28 is coupled to the internal combustion engine 24. The treatment system 28 treats a flow of exhaust gas, indicated by arrow 30, from the internal combustion engine 24 when the internal combustion engine 24 is being fueled, i.e., when the internal combustion engine 24 is running. The exhaust gas treatment system 28 further treats the flow of air, also indicated by arrow 30, from the internal combustion engine 24 when the internal combustion engine 24 is spinning and not being fueled. The exhaust gas treatment system 28 treats the flow of exhaust gas and the flow of air from the internal combustion engine 24 to reduce the toxicity of the flow of exhaust gas and the flow of air, i.e., to reduce toxic emissions of the flow of exhaust gas and the flow of air, including but not limited to, nitrogen oxides (NO), carbon monoxide (CO) and/or hydrocarbons (HC).

The exhaust gas treatment system 28 includes a hydrocarbon absorber 32. The hydrocarbon absorber 32 is disposed downstream of the internal combustion engine 24, and may be incorporated into a close coupled catalyst, disposed in close proximity to exhaust gas outlets of the internal combustion engine 24. However, it should be appreciated that the hydrocarbon absorber 32 is not limited to being part of the close coupled catalyst. The hydrocarbon absorber 32 absorbs and/or collects hydrocarbons disposed within and/or suspended in the flow of air from the internal combustion engine 24. The hydrocarbon absorber 32 may include any structure and/or assembly capable of collecting hydrocarbons from the flow of air created from the internal combustion engine 24 when the internal combustion engine 24 is spinning but is not being fueled.

The exhaust gas treatment system 28 further includes a catalytic converter unit 34. The catalytic converter unit 34 is disposed downstream of the hydrocarbon absorber 32. The catalytic converter unit 34 includes an electrically heated catalyst 36 and a primary catalyst 38. As shown, the electrically heated catalyst 36 is disposed upstream of the primary catalyst 38. The electrically heated catalyst 36 and the primary catalyst 38 may include, but are not limited to, a three way catalyst. The electrically heated catalyst 36 and the primary catalyst 38 may include Platinum Group Metals (PGM), and convert a percentage of the nitrogen oxides in the exhaust gas into nitrogen and carbon dioxide or water, as well as oxidizes a percentage of the carbon monoxide to carbon dioxide and oxidizes a percentage of the unburnt hydrocarbons to carbon dioxide and water.

The catalytic converter unit 34 also defines a bypass path 40. The bypass path 40 defines a fluid flow path that bypasses the electrically heated catalyst 36. As shown, the electrically heated catalyst 36 includes a tubular shape. The tubular shape is disposed annularly about and defines the bypass path 40, with the bypass path 40 extending along a central opening 42 of the tubular shaped electrically heated catalyst 36.

A bypass valve 44 is also disposed within the catalytic converter unit 34. The bypass valve 44 is configured for controlling fluid flow through the bypass path 40, to thereby direct the fluid flow between the electrically heated catalyst 36 and the primary catalyst 38. The bypass valve 44 is disposed upstream of the bypass path 40, and is configured for opening and closing fluid flow through the central region of the tubular shaped electrically heated catalyst 36 defining, i.e., the bypass path 40. The bypass valve 44 is moveable between an open position and a closed position. When the bypass valve 44 is disposed in the open position, the bypass valve 44 directs fluid flow, e.g., the flow of air and/or the flow of exhaust gas, through the bypass path 40, thereby bypassing the electrically heated catalyst 36. When the bypass valve 44 is disposed in the closed position, the bypass valve 44 directs fluid flow, e.g., the flow of air and/or the flow of exhaust gas, through the electrically heated catalyst 36. It should be appreciated that the exhaust gas system may be configured, and the relative positions of the various elements, including but not limited to the hydrocarbon absorber 32, the electrically heated catalyst 36, the bypass path 40, the primary catalyst 38 and/or the bypass valve 44, may differ from that schematic system shown in FIG. 1.

Figure 2:
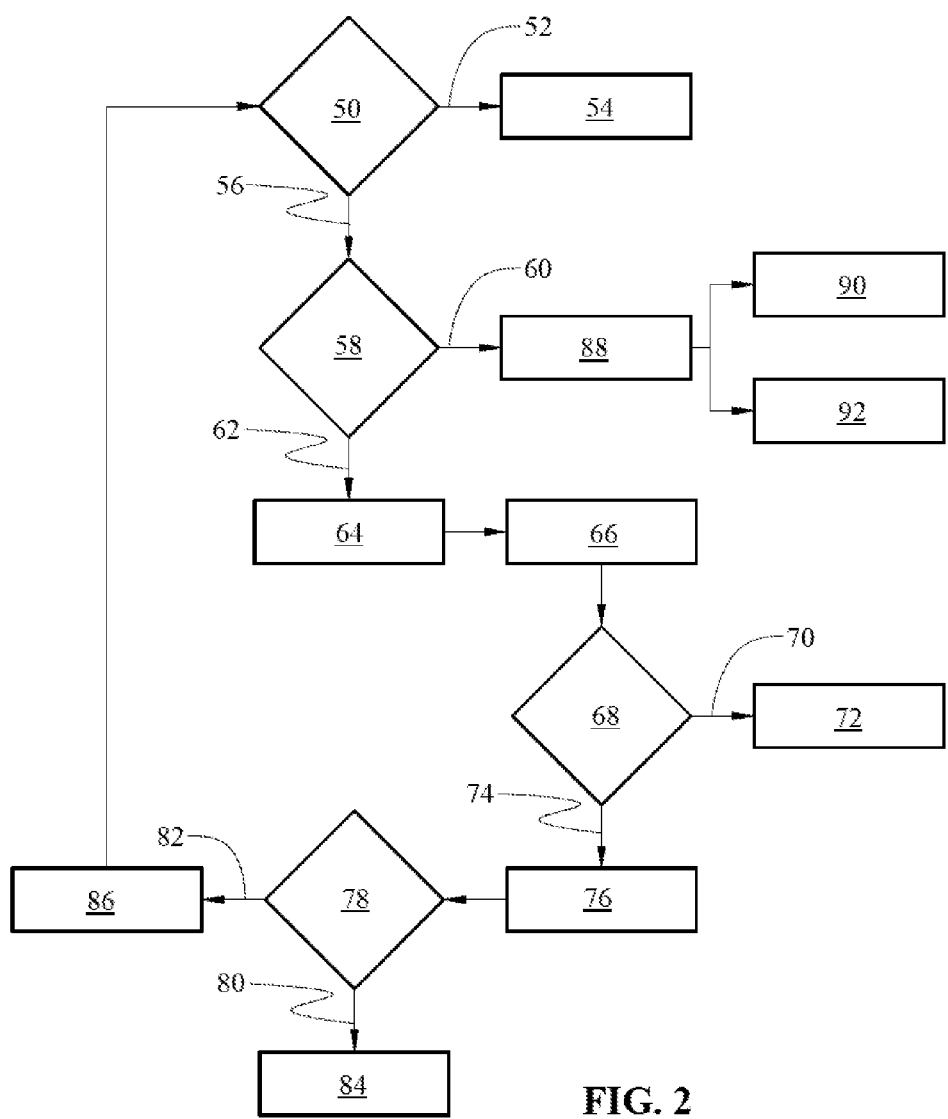
FIG. 2 is a flow chart showing a method of operating the hybrid vehicle to maintain the thermal efficiency of an electrically heated catalyst of the exhaust gas treatment system.

Referring also to FIG. 2, a method of operating the hybrid vehicle 20, and more specifically a method of treating emissions from the internal combustion engine 24 of the hybrid vehicle 20 is provided. The method includes determining if an internal combustion engine 24 is spinning or is not spinning, generally indicated by box 50. As noted above, when the electric motor 26 is supplying all of the drive torque to the transmission 22, the electric motor 26 may, under certain conditions, spin the internal combustion engine 24 via the transmission 22. The vehicle 20 may determine if the internal combustion engine 24 is or is not spinning in any suitable manner, including but not limited to querying one or more control modules, monitoring one or more sensors and/or analyzing the data provided therefrom. If the internal combustion engine 24 is not spinning, generally indicated at 52, then the internal combustion engine 24 is not producing any emissions, and no further action is required generally indicated by box 54.

If the internal combustion engine 24 is spinning, generally indicated at 56, then the vehicle 20 determines if the internal combustion engine 24 is being fueled or is not being fueled, generally indicated by box 58. When the internal combustion engine 24 is spinning, the internal combustion may be being fueled to generate the drive torque for the vehicle 20, or may not be fueled, and is only being spun as a byproduct of the engagement of the electric motor 26. If the internal combustion engine 24 is spinning and is being fueled, generally indicated at 60, then the internal combustion engine 24 may be producing a flow of heated exhaust gas that is treated by the exhaust treatment system 28 to remove unburnt hydrocarbons therefrom. If the internal combustion engine 24 is spinning, but is not being fueled, generally indicated at 62, then the internal combustion engine 24 may be producing a flow of non-heated air, which also must be treated by the exhaust treatment system 28 to remove hydrocarbons therefrom. The vehicle 20 may determine if the internal combustion engine 24 is or is not being fueled in any suitable manner, including but not limited to querying one or more control modules, monitoring one or more sensors and/or analyzing the data provided therefrom.

When the internal combustion engine 24 is spinning and is not being fueled, then the flow of air created by the internal combustion engine 24 is directed through the hydrocarbon absorber 32, generally indicated by box 64, so that the hydrocarbon absorber 32 may collect hydrocarbons disposed in the flow of air. Preferably, the hydrocarbon absorber 32 is integrated into the exhaust gas treatment system 28 such that all gases flowing through the exhaust gas treatment system 28 flows through the hydrocarbon absorber 32. As noted above, the hydrocarbon absorber 32 may be integrated into a close coupled catalytic converter.

The method further includes sensing a temperature of the electrically heated catalyst 36, generally indicated by box 66. The sensed temperature of the electrically heated catalyst 36 is compared to the light-off temperature of the catalyst, generally indicated by box 68, to determine if the temperature of the electrically heated catalyst 36 is greater than the light-off temperature or is less than the light-off temperature. If the temperature of the electrically heated catalyst 36 is greater than the light-off temperature of the catalyst, generally indicated at 70, then no further heating of the electrically heated catalyst 36 is required, generally indicated by box 72. However, if the temperature of the electrically heated catalyst 36 is less than the light-off temperature generally indicated at 74, then the method further includes heating an electrically heated catalyst 36 to a light-off temperature, generally indicated by box 76.

When the internal combustion engine 24 is spinning and is being fueled, and the temperature of the electrically heated catalyst 36 is less than the light-off temperature, then the electrically heated catalyst 36 may be heated by directing the flow of heated exhaust gas created by the internal combustion engine 24 across the electrically heated catalyst 36. Directing the flow of heated exhaust gas across the electrically heated catalyst 36 transfers heat from the flow of exhaust gas to the electrically heated catalyst 36. When the internal combustion engine 24 is spinning and is not being fueled, and the temperature of the electrically heated exhaust gas is less than the light-off temperature, then the electrically heated catalyst 36 may be heated by applying an electric current to the electrically heated catalyst 36 to heat the electrically heated catalyst 36 through resistance heating. It should be appreciated that the electrically heated catalyst 36 may alternatively be heated to the light-off temperature by simultaneously directing the flow of heated exhaust gas across the electrically heated catalyst 36 while applying an electric current to the electrically heated catalyst 36.

The method further includes determining if the hydrocarbon absorber 32 is disposed at a full capacity or is disposed at a not full capacity, generally indicated by box 78. If the hydrocarbon absorber 32 is disposed at the full capacity, generally indicated at 80, then the hydrocarbon absorber 32 is unable to absorb additional hydrocarbons, and may not effectively be used to treat the flow of air from the internal combustion engine 24 when the internal combustion engine 24 is spinning but not being fueled. If the hydrocarbon absorber 32 is disposed at the not full capacity, generally indicated at 82, then the hydrocarbon absorber 32 is able to absorb additional hydrocarbons, and may effectively be used to collect the hydrocarbons in the flow of air from the internal combustion engine 24 when the internal combustion engine 24 is spinning but not being fueled. The operating capacity of the hydrocarbon absorber 32 may be determined in any suitable manner, including but not limited to monitoring one or more sensors, or by comparing the operation of the vehicle 20 to a model that predicts the operating capacity of the hydrocarbon absorber 32.

When the hydrocarbon absorber 32 is disposed at the full capacity, the hydrocarbon absorber 32 is not currently able to absorb hydrocarbons from the flow of air. Accordingly, the flow of air must be treated in some other manner to remove the hydrocarbons from the flow of air. Accordingly, when the internal combustion engine 24 is spinning, is not being fueled and the hydrocarbon absorber 32 is at full capacity, the flow of air is directed across the electrically heated catalyst 36 to oxidize the hydrocarbons disposed in the flow of air, generally indicated by box 84. As described above, the electrically heated catalyst 36 is heated to the light-off temperature of the catalyst so as to react with the hydrocarbons in the flow of air, thereby treating the flow of air even when the hydrocarbon absorber 32 is at the full capacity and unable to collect additional hydrocarbons. The flow of air is directed through the electrically heated catalyst 36 by closing the bypass valve 44, which blocks fluid flow through the bypass path 40 and directs the flow of air created by the internal combustion engine 24 across the electrically heated catalyst 36.

When the hydrocarbon absorber 32 is disposed at the not full capacity, the hydrocarbon absorber 32 is currently able to absorb hydrocarbons from the flow of air. Accordingly, the flow of air does not need further treatment from the electrically heated catalyst 36. Therefore, when the internal combustion engine 24 is spinning, is not being fueled and the hydrocarbon absorber 32 is disposed at the not full capacity, the flow of air is directed through the bypass path 40 to and through the primary catalyst 38, generally indicated by box 86. Because the flow of air is not heated, directing the flow of air through the bypass path 40 and the primary catalyst 38 bypasses the electrically heated catalyst 36, and conserves thermal energy stored within the electrically heated catalyst 36, as the flow of air is unable to absorb heat from the electrically heated catalyst 36. The flow of air is directed through the bypass path 40 and the primary catalyst 38 by opening the bypass valve 44, thereby allowing fluid flow through the bypass path 40.

When the internal combustion engine 24 is spinning and is being fueled, generally indicated at 60, the flow of exhaust gas created therefrom is directed through the hydrocarbon absorber 32, generally indicated by box 88, and then through either the electrically heated catalyst 36, generally indicated by box 90, or the primary catalyst 38, generally indicated by box 92. The flow of heated exhaust gas is directed through the hydrocarbon absorber 32 to heat the hydrocarbon absorber 32 to a temperature sufficient to burn off any hydrocarbons collected therein, i.e., regenerate the hydrocarbon absorber 32, and prepare the hydrocarbon absorber 32 for future use when the internal combustion engine 24 is not being fueled. The flow of exhaust gas is directed through the primary catalyst 38 so that the primary catalyst 38 may treat the flow of exhaust gas and remove the hydrocarbons therefrom. The flow of exhaust gas is directed to the primary catalyst 38 by opening the bypass valve 44 to allow fluid flow therethrough. It should be appreciated that when the internal combustion engine 24 initially begins to run, i.e., when the internal combustion engine 24 is initially fueled, the primary catalyst 38 may not be at the light-off temperature of the catalyst. Therefore, the flow of exhaust gas may initially be directed through the electrically heated catalyst 36 to treat the flow of exhaust gas until the heated exhaust gas heats the primary catalyst 38 to the light-off temperature.

While the best modes for carrying out the invention have been described in detail, those familiar with the art to which this invention relates will recognize various alternative designs and embodiments for practicing the invention within the scope of the appended claims.

The invention claimed is:

1. A method of operating a hybrid vehicle, the method comprising:
   determining if an internal combustion engine is spinning or is not spinning;
   determining if the internal combustion engine is being fueled to generate a drive torque when the internal combustion engine is spinning, or if the internal combustion engine is not being fueled when the internal combustion engine is spinning;
   directing a flow of air created by the internal combustion engine through a hydrocarbon absorber to collect hydrocarbons disposed in the flow of air when the internal combustion engine is spinning and is not being fueled;
   heating an electrically heated catalyst to a light-off temperature, wherein the electrically heated catalyst is disposed downstream of the hydrocarbon absorber;
   determining if the hydrocarbon absorber is disposed at a full capacity and unable to absorb additional hydrocarbons, or if the hydrocarbon absorber is disposed at a not full capacity and is able to absorb additional hydrocarbons; and
   directing the flow of air across the electrically heated catalyst at the light-off temperature to oxidize the hydrocarbons disposed in the flow of air when the internal combustion engine is spinning, the internal combustion engine is not being fueled and the hydrocarbon absorber is disposed at the full capacity, wherein directing the flow of air across the electrically heated catalyst includes closing a bypass valve to block fluid flow through a bypass path and direct the flow of air created by the internal combustion engine across the electrically heated catalyst.

2. A method as set forth in claim 1 further comprising sensing a temperature of the electrically heated catalyst.

3. A method as set forth in claim 2 further comprising comparing the sensed temperature of the electrically heated catalyst to the light-off temperature to determine if the temperature of the electrically heated catalyst is greater than the light-off temperature or less than the light-off temperature.

4. A method as set forth in claim 3 wherein heating the electrically heated catalyst is further defined as directing a flow of exhaust gas created by the internal combustion engine when the internal combustion engine is spinning and is being fueled across the electrically heated catalyst to transfer heat from the flow of exhaust gas to the electrically heated catalyst when the temperature of the electrically heated exhaust gas is less than the light-off temperature.

5. A method as set forth in claim 3 wherein heating the electrically heated catalyst is further defined as applying an electric current to the electrically heated catalyst to heat the electrically heated catalyst through resistance heating when the internal combustion engine is spinning and is not being fueled, and when the temperature of the electrically heated exhaust gas is less than the light-off temperature.

6. A method as set forth in claim 1 further comprising directing the flow of air through a primary catalyst disposed downstream of the hydrocarbon absorber when the internal combustion engine is spinning, the internal combustion engine is not being fueled and the hydrocarbon absorber is disposed at the not full capacity to bypass the electrically heated catalyst and conserve thermal energy within the electrically heated catalyst.

7. A method as set forth in claim 6 wherein directing the flow of air created by the internal combustion engine through the primary catalyst includes opening a bypass valve to allow fluid flow through a bypass path to direct the flow of air created by the internal combustion engine through the primary catalyst.

8. A method as set forth in claim 1 further comprising directing a flow of exhaust gas created by the internal combustion engine when the internal combustion engine is spinning and is being fueled through the hydrocarbon absorber to burn off any hydrocarbons collected in the hydrocarbon absorber, and through a primary catalyst disposed downstream of the hydrocarbon absorber to treat the flow of exhaust gas.

9. A method as set forth in claim 8 wherein directing the flow of exhaust gas created by the internal combustion engine through the primary catalyst includes opening a bypass valve to allow fluid flow through a bypass path to direct the flow of exhaust gas created by the internal combustion engine through the primary catalyst.

10. A method of treating a flow of air from an internal combustion engine of a hybrid vehicle, the method comprising:
determining if the internal combustion engine is spinning or is not spinning;
determining if the internal combustion engine is being fueled to generate a drive torque when the internal combustion engine is spinning, or if the internal combustion engine is not being fueled when the internal combustion engine is spinning;
directing a flow of air created by the internal combustion engine when the internal combustion engine is spinning and is not being fueled through a hydrocarbon absorber to collect hydrocarbons disposed in the flow of air;
heating an electrically heated catalyst to a light-off temperature, wherein the electrically heated catalyst is disposed downstream of the hydrocarbon absorber;
determining if the hydrocarbon absorber is disposed at a full capacity and unable to absorb additional hydrocarbons, or if the hydrocarbon absorber is disposed at a not full capacity and is able to absorb additional hydrocarbons;
directing the flow of air across the electrically heated catalyst at the light-off temperature to oxidize the hydrocarbons disposed in the flow of air when the internal combustion engine is spinning, the internal combustion engine is not being fueled and the hydrocarbon absorber is disposed at the full capacity; and
directing the flow of air through a bypass path to a primary catalyst disposed downstream of the hydrocarbon absorber when the internal combustion engine is spinning, the internal combustion engine is not being fueled and the hydrocarbon absorber is disposed at the not full capacity to bypass the electrically heated catalyst and conserve thermal energy within the electrically heated catalyst.

11. A vehicle comprising:
a transmission configured for receiving a drive torque and transmitting the drive torque to a drive wheel;
an internal combustion engine coupled to the transmission and configured for selectively supplying the drive torque to the transmission;
an exhaust gas treatment system coupled to the internal combustion engine and configured for treating a flow of exhaust gas created by the internal combustion engine when the internal combustion engine is being fueled;
an electric motor coupled to the transmission and configured for selectively supplying the drive torque to the transmission;
wherein the electric motor spins the internal combustion engine in an un-fueled state thereby creating a flow of unheated air through the exhaust gas treatment system when the electric motor is supplying the drive torque to the transmission;
the exhaust gas treatment system including:
a hydrocarbon absorber;
an electrically heated catalyst disposed downstream from the hydrocarbon absorber;
a primary catalyst disposed downstream from the hydrocarbon absorber;
a bypass path in fluid communication with the primary catalyst and defining a fluid flow path that bypasses the electrically heated catalyst; and
a bypass valve configured for controlling fluid flow through the bypass path;
wherein the bypass valve is disposed in a closed position to direct a flow of air across the electrically heated catalyst when the electric motor is supplying the drive torque to the transmission and spinning the internal combustion engine while the internal combustion engine is not being fueled and the hydrocarbon absorber is at a full capacity and unable to absorb additional hydrocarbons; and
wherein the bypass valve is disposed in an open position to allow fluid flow through the bypass path and direct the flow of air from the internal combustion engine through the primary catalyst when the electric motor is supplying the drive torque to the transmission and spinning the internal combustion engine while the internal combustion engine is not being fueled and the hydrocarbon absorber is at a not full capacity and is able to absorb additional hydrocarbons.

12. A vehicle as set forth in claim 11 wherein the electrically heated catalyst, the primary catalyst, the bypass path, and the bypass valve are all disposed within a catalytic converter unit.

13. A vehicle as set forth in claim 12 wherein the electrically heated catalyst includes a tubular shape disposed annularly about and defining the bypass path, with the bypass path extending along a central opening of the tubular shaped electrically heated catalyst and in fluid communication with the primary catalyst.

14. A vehicle as set forth in claim 13 wherein the bypass valve is disposed upstream of the primary catalyst and is configured for opening and closing fluid flow through the central opening of the tubular shaped electrically heated catalyst defining the bypass path.

15. A vehicle as set forth in claim 14 wherein the primary catalyst is disposed downstream of and in fluid communication with the electrically heated catalyst.

* * * * *